Figure 1:
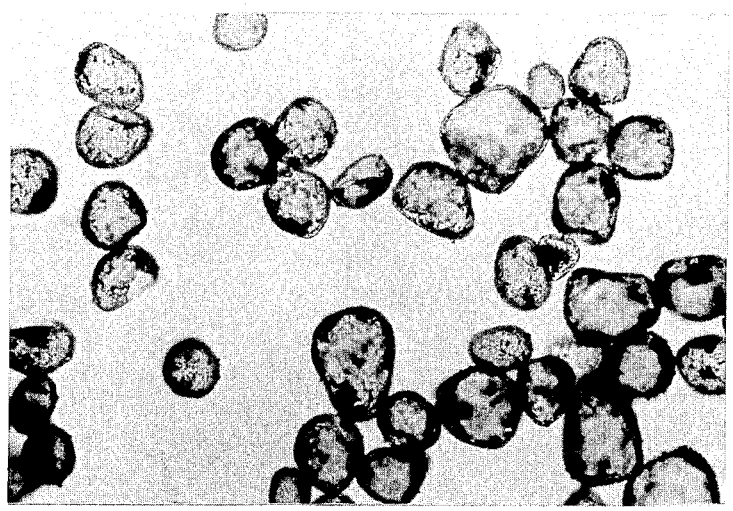

United States Patent [19]

Takahashi et al.

[11] Patent Number: 4,647,499
[45] Date of Patent: Mar. 3, 1987

[54] SHAPED BODY OF CALCIUM SILICATE AND PROCESS FOR PRODUCING SAME

[75] Inventors: Akira Takahashi, Kagamihara; Kazuo Shibahara, Motosu; Katsuhiro Morimoto, Ibi; Hiromasa Samma, Ogaki; Kazuhiko Kubo, Motosu, all of Japan

[73] Assignee: Kabushiki Kaisha Osaka Packing Seizosho, Osaka, Japan

[21] Appl. No.: 776,053

[22] PCT Filed: Dec. 28, 1984

[86] PCT No.: PCT/JP84/00628
§ 371 Date: Aug. 27, 1985
§ 102(e) Date: Aug. 27, 1985

[87] PCT Pub. No.: WO85/02839
PCT Pub. Date: Jul. 4, 1985

[30] Foreign Application Priority Data
Dec. 28, 1983 [JP] Japan ............................... 58-246529
Apr. 16, 1984 [JP] Japan ............................... 59-76846

[51] Int. Cl.[4] ........................... B32B 3/26; C04B 2/02
[52] U.S. Cl. ............................. 428/312.6; 428/312.8; 428/402; 106/120
[58] Field of Search ................ 428/312.6, 312.8, 402; 106/120

[56] References Cited

U.S. PATENT DOCUMENTS

| | | | |
|---|---|---|---|
| 3,001,882 | 9/1981 | Taylor | 106/120 |
| 4,162,924 | 7/1979 | Kubo et al. | 106/120 |
| 4,230,765 | 10/1980 | Takahashi et al. | 428/283 |
| 4,295,893 | 10/1981 | Takahashi et al. | 106/120 |
| 4,298,386 | 11/1981 | Kubo et al. | 501/80 |

FOREIGN PATENT DOCUMENTS 2115395 2/1982 United Kingdom

Primary Examiner—John E. Kittle
Assistant Examiner—Patrick J. Ryan
Attorney, Agent, or Firm—Armstrong, Nikaido, Marmelstein & Kubovcik

[57] ABSTRACT

A calcium silicate shaped body which comprises a multiplicity of interconnected secondary particles of calcium silicate crystals, voids interspersed between the secondary particles, and at least one inorganic inactive substance selected from among carbonaceous substance, carbide, nitride, silicide and metallic oxide which is physically united with the secondary particles, the shaped body containing the inactive substance in an amount of 21 to 70% by weight; and a calcium silicate shaped body which comprises a multiplicity of interconnected secondary particles of calcium silicate crystals, voids interspersed between the secondary particles, and at least one inorganic inactive substance selected from among carbonaceous substance, carbide, nitride, silicide and metal oxide and physically united with the secondary particles, and an amorphous siliceous substance.

19 Claims, 2 Drawing Figures

DRAWING

SHAPED BODY OF CALCIUM SILICATE AND PROCESS FOR PRODUCING SAME

TECHNICAL FIELD

The present invention relates to novel shaped bodies of calcium silicate having outstanding heat insulating properties and to a process for producing the same.

BACKGROUND ART

Calcium silicate shaped bodies are lightweight, have excellent heat insulating properties, high fire resistance and various other characteristics, and are therefore widely used.

In the field of heat insulating materials and the like, there is a demand for calcium silicate shaped bodies of improved heat insulating properties in recent years.

Accordingly processes have been proposed for giving improved heat insulating properties by incorporating various substances into calcium silicate shaped bodies.

U.S. Pat. No. 3,001,882 discloses a process for producing a shaped body having improved heat insulating properties at a high temperature (288° C., 550° F.) by adding a chemically inactive substance to a starting slurry composed of a calcareous material, a siliceous material and water, shaping the slurry, and subjecting the green shaped body obtained to a hydrothermal synthesis reaction. With this process, however, the strength of the shaped body tends to decrease with an increase in the amount of inactive substance used. Especially when the amount exceeds 20% by weight of the shaped body, the shaped body obtained is exceedingly low in strength and is not usable. Thus, although the process wherein the green shaped body is subjected to hydrothermal synthesis reaction gives improved heat insulating properties at a high temperature, the improvement is inherently limited and is still insufficient, while the process fails to afford improved heat insulating properties at low temperatures of up to about 200° C.

Unexamined Japanese Patent Publication No. SHO 58-145652 discloses (a) a process for producing a shaped body by preparing a slurry of calcium silicate crystals first, adding to the slurry a substance which absorbs or diffuses radiant energy, shaping the resulting slurry and drying the shaped body: (b) a process for producing a shaped body of calcium silicate crystals by preliminarily reacting a starting slurry to obtain a slurry of C-S-H (I) which is a precursor of crystalline calcium silicate, adding the above substance to the slurry, shaping the slurry and curing the green shaped body with steam: and (c) a process for producing a shaped body of calcium silicate crystals by preliminarily reacting a starting slurry containing the above substance to obtain a slurry of C-S-H (I), shaping the slurry and curing the green shaped body with steam. However, the processes (a) and (b) are unable to produce a useful lightweight shaped body because of seriously reduced strength if more than 20% by weight of the substance is present based on the shaped body, while the process (c) encounters difficulties in producing a shaped body itself owing to deformation or shrinkage if not smaller than 15% by weight of the substance is used. Further although these processes achieve some improvement in the heat insulating properties of the shaped body at high temperatures of at least 300° C., the improvement is still insufficient, whereas the processes fail to attain any substantial improvement in the heat insulating properties at low temperatures of up to about 200° C.

DISCLOSURE OF THE INVENTION

An object of the present invention is to provide a novel shaped body of calcium silicate which is lightweight and has outstanding heat insulating properties over a wide temperature range of from low to high temperatures, and also a process for producing the shaped body.

Another object of the present invention is to provide a novel shaped body of calcium silicate which is lightweight and has outstanding heat insulating properties over a wide temperature range while retaining fully satisfactory strength for use, and a process for producing the same.

Other features of the present invention will be made apparent from the following description.

The present invention provides a calcium silicate shaped body which comprises a multiplicity of interconnected secondary particles of calcium silicate crystals, voids interspersed between the secondary particles, and at least one inorganic inactive substance selected from among carbonaceous substance, carbide, nitride, silicide and metallic oxide and physically united with the secondary particles, the shaped body containing the inactive substance in an amount of 21 to 70% by weight. The present invention further provides a calcium silicate shaped body which comprises a multiplicity of interconnected secondary particles of calcium silicate crystals, voids interspersed between the secondary particles, at least one inorganic inactive substance selected from among carbonaceous substance, carbide, nitride, silicide and metallic oxide and physically united with the secondary particles, and an amorphous siliceous substance.

Our research has revealed that when a shaped body already developed by the present applicant and disclosed in U.S. Pat. No. 3,679,446 comprises secondary particles of a large number of interconnected calcium silicate crystals and at least 21% by weight of at least one inorganic inactive substance selected from among carbonaceous substance, carbide, nitride, silicide and metallic oxide and physically united with the secondary particles, the shaped body has the following novel features:

(1) despite the presence of the specific inactive substance in an amount of at least 21% of the weight of the shaped body, the shaped body is lightweight and retains fully satisfactory strength for use,
(2) the shaped body has remarkably improved heat insulating properties at high temperatures of at least 200° C., and
(3) the shaped body has remarkably improved heat insulating properties also at lower temperatures of up to 200° C.

Our research has further revealed that when the shaped body of the above-specified structure has incorporated an amorphous siliceous substance therein, the shaped body exhibits more improved heat insulating properties especially at low temperatures of up to 200° C. without any substantial reduction in the strength despite the presence of the amorphous siliceous substance.

Our research has further revealed that the presence of the amorphous siliceous substance produces the above effect still to a remarkable extent even if the content of the inactive substance is less than 21% by weight, and that in this case the effect of the inactive substance to improve the heat insulating properties especially at high temperatures combines with the effect of the amorphous siliceous substance to improve the heat insulating properties especially at low temperatures to produce an overall effect to give greatly improved heat insulating properties over a wide temperature range. The present invention has been accomplished based on the above findings.

The shaped body of calcium silicate of the present invention can be basically produced, for example, according to the process for producing calcium silicate shaped bodies disclosed in U.S. Pat. Nos. 3,501,325 or 3,679,446 wherein a starting slurry containing a siliceous material, a calcareous material and water is subjected to a hydrothermal synthesis reaction with heating and stirring at an elevated pressure to prepare an aqueous slurry of secondary particles of calcium silicate crystals, followed by shaping and drying. In the above process the shaped body of the present invention can be prepared by the method characterized in that a specific amount of the specified inactive substance is added to the starting slurry, or the inactive substance is added to the starting slurry and further admixing the amorphous siliceous substance is added to the aqueous slurry resulting from the hydrothermal reaction.

More specifically, the present invention provides a process for producing a calcium silicate shaped body by subjecting a starting slurry containing a siliceous material, a calcareous material and water to a hydrothermal synthesis reaction with heating and stirring at an elevated pressure to obtain an aqueous slurry of secondary particles of calcium silicate crystals, followed by shaping and drying, the process being characterized by adding to the starting slurry at least one inorganic inactive substance selected from among carbonaceous substance, carbide, nitride, silicide and metallic oxide to cause the inactive substance to physically unite with the secondary particles by the hydrothermal synthesis reaction, and using the inactive substance in an amount of 21 to 70% by weight based on the shaped body. The invention also provides a process for producing a calcium silicate shaped body by subjecting a starting slurry containing a siliceous material, a calcareous material and water to a hydrothermal synthesis reaction with heating and stirring at an elevated pressure to obtain an aqueous slurry of secondary particles of calcium silicate crystals, followed by shaping and drying, the process being characterized by adding to the starting slurry at least one inorganic inactive substance (hereinafter referred to as "inactive substance") selected from among carbonaceous substance, carbide, nitride, silicide and metallic oxide to cause the inactive substance to physically unite with the secondary particles by the hydrothermal synthesis reaction, and admixing an amorphous siliceous substance with the aqueous slurry of calcium silicate crystals.

Our research has revealed that when the inactive substance is added to the starting aqueous slurry before the hydrothermal synthesis reaction which is to be conducted with stirring, the inactive substance physically unites with the secondary particles of calcium silicate crystals, so that the inactive substance can be incorporated in a large amount into the shaped body to be prepared from such secondary particles while permitting the shaped body to have lightweightness and fully satisfactory strength for use. We have further found that the amorphous siliceous substance, when to be used, can be added after the hydrothermal synthesis reaction almost without entailing any reduction in the strength of the resulting shaped body and consequently that when the inactive substance is added before the hydrothermal reaction with amorphous siliceous substance added after the reaction, the shaped body can be given more greatly improved heat insulating properties over a wide temperature range than when the inactive substance is used singly, without substantially impairing the strength of the shaped body. The production processes of the present invention have been accomplished based on these findings.

The shaped body of the present invention, which has fully satisfactory strength for use, has over a wide temperature range a greatly reduced thermal conductivity afforded by a large amount of inactive substance present singly or by a combined use of the inactive substance with the amorphous siliceous substance.

The shaped body of the present invention is improvement of one disclosed in U.S. Pat. No. 3,679,446. The improvement is in that the inactive substance is present in a special state or in combination with the amorphous siliceous substance. More specifically, the shaped body of the present invention consists essentially of a multiplicity of interconnected secondary particles of calcium silicate crystals and voids interspersed between the secondary particales and further comprises the inactive substance which is physically united with the secondary particles. This gives fully satisfactory strength for use and yet permits presence of a large amount of the inactive substance.

Each of the secondary particles of calcium silicate crystals is originally in the form of a substantially globular shell formed of three-dimensionally interlocked calcium silicate crystals and having an outside diameter of about 5 to about 150 μm. The secondary particles of calcium silicate crystals are present in the shaped body as compressed in at least one direction by the shaping pressure. The inactive substance is physically united with the secondary particles as enclosed in the secondary particles. An observation under an optical microscope as well as under a scanning electron microscope reveals that the shaped body of the present invention has the structure described.

Figure 2:
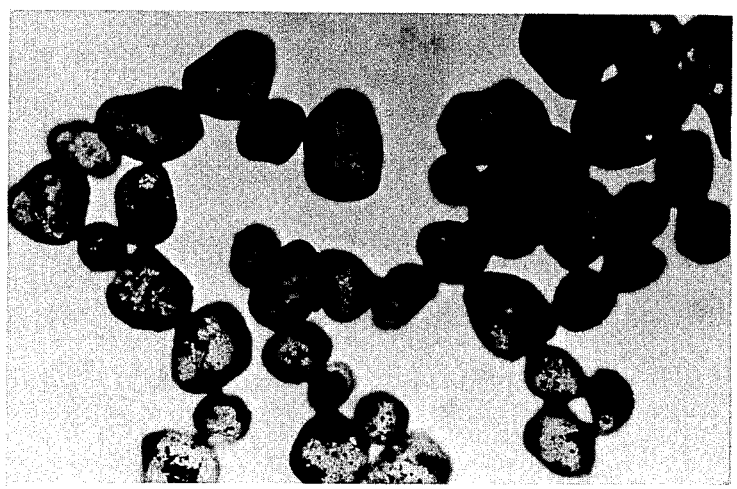

The above mode in which the inactive substance is present is attributable to the fact that the inactive substance, which is added to the aqueous slurry before the hydrothermal synthesis reaction to be conducted with stirring, is physically united with secondary particles of calcium silicate crystals as enclosed therein when the secondary particles are formed. This is apparent from an optical microscopic observation of the aqueous slurry of secondary particles of calcium silicate crystals, e.g., from FIG. 1 and FIG. 2. FIG. 1 is an optical photomicrograph (at a magnification of 250×) of an aqueous slurry of secondary particles of calcium silicate crystals which is free of any inactive substance and serving as a control (one used for preparing specimen No. 1 of shaped body in Example 1). FIG. 2 is an optical photomicrograph (at a magnification of 250×) of an aqueous slurry of secondary particles of calcium silicate crystals obtained with addition of rutile before hydrothermal synthesis reaction according to the invention (one used for preparing specimen No. 3 of shaped body in Example 1). FIGS. 1 and 2 show that rutile added before the reaction is physically united with the secondary particles as enclosed therein. The rutile is not physically united with the secondary particles when added after the hydrothermal reaction.

The shaped body of the present invention is prepared basically by the same process as those disclosed in U.S. Pat. No. 3,679,446 and U.S. Pat. No. 3,501,325 on which the former patent is based, with the exception of using the inactive substance and/or the amorphous siliceous substance.

Any of siliceous materials which have heretofore been used for producing calcium silicate shape bodies is advantageously usable as such for the present invention. Examples thereof are crystalline siliceous materials such as siliceous stone, siliceous sand, etc., and amorphous siliceous materials such as silica gel, silica flour (such as ferrosilicon dust, etc.), white carbon, diatomaceous earth, silica obtained by reacting aluminum hydroxide with hydrosilicofluoric acid resulting as a by-product from the wet process for preparing phosphoric acid, etc. The calcareous material can be any of those heretofore used, such as quick lime, slaked lime, carbide residuum, etc.

The $CaO/SiO_2$ mole ratio of the calcareous material to the siliceous material is about 0.70 to about 0.90 when tobermorite crystals are to be synthesized, or about 0.90 to about 1.15 when xonotlite crystals are to be obtained.

According to the present invention, an inactive substance and water are added to the siliceous material and the calcareous material to prepare a starting slurry.

The inactive substance to be used in this invention is at least one of carbonaceous substances, carbides, nitrides, silicides and metallic oxides. Examples of useful inactive substances are carbonaceous materials such as active carbon, charcoal, coal, carbon black and graphite; carbides such as silicon carbide, boron carbide and titanium carbide; nitrides such as silicon nitride, boron nitride and titanium nitride; silicides such as calcium silicide; and metallic oxides such as iron oxides (hematite, magnetite, etc.), titanium oxides (rutile, etc.), tin oxides, manganese oxides, zirconium oxides, ilmenite, zircon and chromite. These substances are usable singly, or at least two of them can be used in mixture. It is suitable that the inactive substance be usually about 0.001 to about 120 $\mu$m, preferably 0.001 to 100 $\mu$m, in particle size.

The amount of inactive substance to be used in this invention differs depending on whether the amorphous siliceous substance is used conjointly therewith.

When a remarkable reduction is to be achieved in the thermal conductivity over a wide temperature range in the absence of the amorphous siliceous substance, the inactive substance needs to be present in a large amount. In this case, accordingly, the amount is such that the shaped body will contain 21 to 70% by by weight, preferably 25 to 55% by weight, of the inactive substance. Conventionally, it has been impossible to use such a large amount of inactive substance since marked lower strength will then result, whereas even if a large amount is used according to the invention, the resulting shaped body retains fully satisfactory strength and is given the unique effect afforded by the presence of the large amount, i.e. improved heat insulating properties over a wide temperature range of from low to high temperatures. Below 21% by weight, the improvement in heat insulating properties is achieved to some extent at high temperatures but is almost unavailable at low temperatures. Above 70% by weight, radiation heat transfer is inhibited but increased heat transfer through the solid of the inactive substance occurs to totally result in an insufficient improvement in heat insulating properties. Difficulty is further encountered in giving lightweight shaped bodies because of reduced bending strength.

The amorphous siliceous substance, when used, affords improved heat insulating properties especially at low temperatures, whereby an improvement is achieved in the heat insulating properties over a wide temperature range even if the inactive substance is used in a smaller amount. In this case, therefore, the inactive substance is used in such an amount that the resulting shaped body will contain about 2 to about 60% by weight, preferably 5 to 50% by weight, of the inactive substance. Below 2% by weight, an insufficient improvement of heat insulating properties will result at high temperatures even when the amorphous siliceous substance is used conjointly, whereas above 60% by weight, the increase in the combined amount of the inactive substance and the amorphous siliceous substance gives reduced bending strength to the shaped body and results in the tendency that it becomes difficult to obtain lightweight shaped bodies.

According to the present invention, it is required to incorporated the inactive substance into the starting slurry to be subjected to a hydrothermal synthesis reaction. This permits the presence of a large amount of the inactive substance without entailing a great reduction in the strength. The inactive substance, when added after the reaction, results in a marked reduction in strength of the shaped body, e.g., in the bending strength thereof.

The starting slurry may have further incorporated therein known additives. Examples of such additives are inorganic fibrous materials such as asbestos and rock wool.

The amount of water to be used for preparing the starting slurry is at least 5 times, preferably 10 to 50 times, the amount by weight of the solids of the slurry. When a lightweight body of about 0.1 g/cm$^3$ in bulk density is to be produced, it is suitable that the amount by 15 to 50 times, preferably 20 to 40 times, the amount by weight of the slurry solids.

The starting slurry thus prepared is then subjected to a hydrothermal synthesis reaction with stirring. The reaction is conducted at a saturated water vapor pressure usually of at least 4 kg/cm$^2$, preferably 6 to 30 kg/cm$^2$. This reaction produces a slurry of secondary particles having an outside diameter of about 5 to about 150 $\mu$m and composed predominantly of three-dimensionally interlocked tobermorite crystals and/or xonotlite crystals, the secondary particles having the inactive substance physically united therewith as enclosed therein, the slurry containing the secondary particles as uniformly dispersed in water.

According to the present invention, the aqueous slurry containing the large amount of inactive substance may be shaped as it is or after having incorporated therein the amorphous siliceous substance for giving further improved heat insulating properties at low temperatures. When the content of the inactive substance is less than 21% by weight based on the shaped body to be obtained, it is necessary to admix the amorphous siliceous substance with the slurry before shaping. In either case, a shaped body is obtained of course with remarkably improved heat insulating properties over a wide temperature range.

The siliceous substance to be added in this invention as required needs to be amorphous. If crystalline siliceous substances are used, improved heat insulating properties are not available. Further it is necessary to add the amorphous siliceous substance to the slurry of secondary particles of calcium silicate crystals resulting from the hydrothermal synthesis reaction. This combines the effect of the inactive substance to give improved heat insulating properties with the effect of the amorphous siliceous substance to give improved heat insulating properties, consequently affording improved heat insulating properties over a wide temperature range.

Examples of useful amorphous siliceous substances are white carbon, ferrosilicon dust, silicon dust, silica gel, diatomaceous earth, fly ash, etc. These substances are usable singly, or at least two of them can be used in combination. Preferably usable as silica gel is Opsil-II disclosed in U.S. Pat. No. 4,230,765 (Examined Japanese Patent Publication No. SHO 55-14809) and already developed by the present applicant, i.e., secondary particles of high-purity porous silica gel having shapability. As disclosed in U.S. Pat. No. 4,230,765, Opsil-II means secondary particles of high-purity porous silica gel obtained by carbonating secondary particles of calcium silicate crystals in the presence of water to convert the calcium silicate into silica gel and superfine particulate calcium carbonate and subsequently treating the product with an acid.

It is suitable that the amorphous siliceous substance to be used be usually about 0.001 to about 150 μm, preferably 0.001 to 100 μm, in particle size.

The amorphous siliceous substance is used in such an amount that the resulting shaped body will contain about 2 to about 60% by weight, preferably 5 to 50% by weight, of the substance. If the amount is less than 2% by weight, a sufficient improvement will not be achieved in the heat insulating properties at low temperature, whereas above 60% by weight, the shaped body obtained tends to exhibit a markedly reduced bending strength, hence objectionable.

Further the combined amount of the inactive substance and the amorphous siliceous substance to be used in this invention is preferably about 4 to about 70% by weight, more preferably 10 to 50% by weight, based on the shaped body. If the amount is less than 4% by weight, there is the tendency that fully improved heat insulating properties will not be obtained over a wide temperature range, whereas above 70% by weight, markedly reduced bending strength will result, hence undesirable.

Accordingly to the present invention, various additives may further be admixed with the slurry to be shaped. Examples of useful additives are a wide variety of those which are used for preparing calcium silicate shaped bodies, such as fibers, clays, cements, binders, etc.

According to the present invention, the aqueous slurry comprising secondary particles of calcium silicate crystals and inactive substance and further containing other additives when required, or a mixture obtained by admixing the amorphous siliceous substance with the slurry is shaped by a usual method, for example, by dewatering by press molding, centrifugation or the like, and thereafter dried to obtain a shaped body of calcium silicate. When required, the aqueous slurry or mixture containing the inactive substance and prepared as above is placed into a mold and then press-formed on dewatering, and a slurry of calcium silicate crystals free from any inactive substance and obtained by a usual method is similarly press-formed in the mold over the resulting shaped body, or these procedures are performed in a reverse order, whereby a laminated shaped body can be obtained.

The shaped body of the present invention thus obtained consists essentially of globular shell-like secondary particles having an outside diameter of about 5 to about 150 μm and formed of three-dimensionally interlocked calcium silicate crystals, voids interspersed between the secondary particles, and an inactive substance physically united with the secondary particles as enclosed therein or such inactive substance and an amorphous siliceous substance. Although having a low density, the shaped body retains fully satisfactory strength for use and has remarkably improved heat insulating properties over a wide temperature range due to the presence of the inactive substance in a large amount or of the inactive substance and the amorphous siliceous substance.

According to the present invention, desired lightweight shaped bodies of calcium silicate can be easily produced with low to high densities. When a lightweight shaped body of low density, for example, a shaped body having a bulk density of 0.1 g/cm$^3$ is to be preduced, it is desirable to use a lime milk having a sedimentation volume of at least 5 ml, more desirably of at least 10 ml.

The sedimentation volume of a lime milk is determined by placing 50 ml of the lime milk as adjusted to a water to lime solids rario of 120:1 into a messcylinder having an inside diameter of 1.3 cm and capacity of 50 cm$^3$, allowing the milk to stand for 20 minutes and then measuring the volume in ml of the settled lime particles. A large sedimentation volume indicates that the lime is effectively dispersible in water in a stable state and is highly reactive. Use of a lime milk having a larger sedimentation volume produces calcium silicate crystal secondary particles of lower apparent density, thus facilitating production lightweight bodies of lower density.

BEST MODE OF CARRYING OUT THE INVENTION

The present invention will be described below in greater detail with reference to the following examples and comparative examples, wherein the parts and percentages are by weight. The properties were determined by the following methods.
(a) Bending strength: According to the method of JIS A 9510.
(b) Thermal conductivity: According to the hollow cylindrical method of JIS A 9510.

EXAMPLE 1

Quick lime (CaO 95%) was hydrated in hot water at 80° C. and dispersed in water by a homomixer to obtain a lime milk, which was 14.1 to 15.2 ml in sedimentation volume. To the lime milk was added a powder of siliceous stone ($SiO_2$ 94%), 6.5 μm in mean particle size, in the $CaO/SiO_2$ mole ratio of 1.00. Further added were water and a titanium oxide powder (rutile, 2.3 μm in mean particle size) in such an amount that the resulting shaped body would have a specified rutile content. Thus, a starting slurry was obtained which contained water in 15 times the amount by weight of the solids. The slurry was subjected to a hydrothermal synthesis reaction in an autoclave at a saturated water vapor pressure of 12 kg/cm$^2$ and a temperature of 191° C. for 5 hours while being stirred by a stirrer which was rotated at 40 r.p.m. In this way, slurries of calcium silicate crystals were prepared.

Portions of the crystal slurries were dried at 100° C. for 24 hours and then analyzed by X-ray diffractometer. The analysis revealed the peak of xonotlite crystals in all specimens and further the peak of rutile crystals in the specimens containing titanium oxide particles.

When the crystal slurries were observed under an optical microscope as well as under a scanning electron microscope, all the slurries were found to contain globular shell-like secondary particles having an outside diameter of 5 to 150 82 m and composed of three-dimensionally interlocked xonotlite crystals. With the slurries containing titanium oxide particles, rutile crystals were found to have been physically united with the secondary particles of xonotlite crystals as enclosed therein.

FIGS. 1 and 2 show examples of optical photomicrographs FIG. 2 is a photomicrograph (at a magnification of 250×) of the crystal slurry obtained according to the invention and containing rutile in such an amount as to give a rutile content of 25% by weight to the shaped body to be formed (one used for producing specimen No. 3 of shaped body listed in Table 1 below). FIG. 1 is a photomicrograph (at a magnification of 250×) of a rutile-free crystal slurry (one used for producing specimen No. 1 of shaped body in Table 1). When compared with FIG. 1, FIG. 2 shows that the rutile is physically united with secondary particles of xonotlite crystals as enclosed therein.

Subsequently, 7 parts of glass fibers and 3 parts of portland cement were added to 90 parts (solids) of each of the crystal slurries obtained above, and the mixture was pressed for dewatering and shaping and then dried at 100° C. to obtain a tubular shaped body, 114 mm in inside diameter, 50 mm in wall thickness and 610 mm in length.

The shaped bodies thus prepared were checked for structure by an optical microscope and scanning electron microscope. All the bodies were found to have been composed of a multiplicity of interconnected secondary particles of xonotlite crystals. In the bodies containing titanium oxide particles, rutile crystals were physically united with the secondary particles as enclosed therein.

Table 1 shows the properties of the shaped bodies.

temperature range than the rutile-free shaped body, specimen No. 1. When compared with the rutile-free shaped body, specimen No. 1, specimen No. 2 having a low rutile content is lower in thermal conductivity at an average temperature of 150° C. or higher, but the reduction is insufficient, and there is little or no reduction in thermal conductivity at an average temperature of 70° C. Specimen No. 8 which conversely has a high rutile content is insufficient in the reduction of thermal conductivity, has exceedingly low bending strength and is not actually usable.

EXAMPLE 2

Quick lime (CaO 95%) was hydrated in hot water at 80° C. and dispersed in water by a homomixer to obtain a lime milk, which was 13.5 to 15.2 ml in sedimentation volume. To the lime milk was added a powder of siliceous stone ($SiO_2$ 94%), 7.1 μm in mean particle size, in the $CaO/SiO_2$ mole ratio of 1.00. Further added were water and an iron oxide powder (hematite, 0.51 μm in mean particle size) in such an amount that the resulting shaped body would have a specified hematite content. Thus, a starting slurry was obtained which contained water in 15 times the amount by weight of the solids. The slurry was subjected to a hydrothermal synthesis reaction in an autoclave at a saturated water vapor pressure of 12 kg/cm² and a temperature of 191° C. for 5 hours while being stirred by a stirrer which was rotated at 40 r.p.m. In this way, slurries of calcium silicate crystals were prepared.

Portions of the crystal slurries were dried at 100° C. for 24 hours and then analyzed by X-ray diffractometer. The analysis revealed the peak of xonotlite crystals in all specimens and further the peak of hematite crystals in the specimens containing iron oxide particles.

When the crystal slurries were observed under an optical microscope as well as under a scanning electron microscope, all the slurries were found to contain globular shell-like secondary particles having an outside diameter of 5 to 150 μm and composed of three-dimensionally interlocked xonotlite crystals. With the slurries containing iron oxide particles, hematite crystals were found to have been physically united with the secondary particles of xonotlite crystals as enclosed therein.

Subsequently, 7 parts of glass fibers and 3 parts of

TABLE 1

| Specimen No. | 1 | 2 | 3 | 4 | 5 | 6 | 7 | 8 |
|---|---|---|---|---|---|---|---|---|
| Sedimentation volume of lime milk (ml) | 14.9 | 15.0 | 14.1 | 15.0 | 14.8 | 15.2 | 14.2 | 15.1 |
| Rutile content (in shaped body, %) | 0 | 15 | 25 | 35 | 45 | 55 | 65 | 75 |
| Properties of shaped body | | | | | | | | |
| Bulk density (g/cm³) | 0.150 | 0.148 | 0.151 | 0.150 | 0.147 | 0.153 | 0.150 | 0.149 |
| Bending strength (kg/cm²) | 10.0 | 9.7 | 8.7 | 8.0 | 6.9 | 5.4 | 3.7 | 0.9 |
| Thermal conductivity (Kcal/m · hr. °C.) Average temp. | | | | | | | | |
| 70° C. | 0.043 | 0.043 | 0.040 | 0.039 | 0.038 | 0.039 | 0.040 | 0.043 |
| 150° C. | 0.051 | 0.048 | 0.045 | 0.044 | 0.043 | 0.044 | 0.045 | 0.050 |
| 250° C. | 0.063 | 0.055 | 0.053 | 0.051 | 0.050 | 0.052 | 0.053 | 0.059 |
| 350° C. | 0.081 | 0.065 | 0.060 | 0.058 | 0.057 | 0.059 | 0.062 | 0.067 |

In Table 1, shaped body specimens Nos. 3 to 7 are according to the invention, while specimes Nos. 1, 2 and 8 are shown for comparison.

Table 1 shows that the shaped bodies of the invention, ranging from 21 to 70% in rutile content, have fully satisfactory strength for use and are further exceedingly lower in thermal conductivity over a wide portland cement were added to 90 parts (solids) of each of the crystal slurries obtained above, and the mixture was pressed for dewatering and shaping and then dried at 100° C. to obtain a tubular shaped body having the same shape as those prepared in Example 1.

The shaped bodies thus prepared were checked for structure by an optical microscope and scanning electron microscope. All the bodies were found to have been composed of a multiplicity of interconnected secondary particles of xonotlite crystals. In the bodies containing iron oxide particles, hematite crystals were physically united with the secondary particles as enclosed therein.

Table 2 shows the properties of the shaped bodies.

TABLE 2

| Specimen No. | 9 | 10 | 11 | 12 | 13 | 14 | 15 | 16 |
|---|---|---|---|---|---|---|---|---|
| Sedimentation volume of lime milk (ml) | 14.2 | 13.5 | 15.1 | 14.3 | 15.2 | 14.8 | 14.1 | 14.7 |
| Hematite content (in shaped body, %) | 0 | 15 | 25 | 35 | 45 | 55 | 65 | 75 |
| Properties of shaped body | | | | | | | | |
| Bulk density (g/cm$^3$) | 0.151 | 0.149 | 0.150 | 0.151 | 0.153 | 0.150 | 0.149 | 0.151 |
| Bending strength (kg/cm$^2$) | 9.5 | 9.0 | 8.4 | 7.7 | 6.5 | 5.0 | 3.2 | 0.9 |
| Thermal conductivity (Kcal/m · hr. °C.) Average temp. | | | | | | | | |
| 70° C. | 0.043 | 0.043 | 0.039 | 0.038 | 0.037 | 0.038 | 0.039 | 0.043 |
| 150° C. | 0.051 | 0.048 | 0.044 | 0.043 | 0.042 | 0.043 | 0.044 | 0.049 |
| 250° C. | 0.063 | 0.056 | 0.052 | 0.051 | 0.050 | 0.051 | 0.052 | 0.058 |
| 350° C. | 0.081 | 0.067 | 0.062 | 0.060 | 0.059 | 0.061 | 0.064 | 0.068 |

In Table 2, shaped body specimens Nos. 11 to 15 are according to the invention, while specimens Nos. 9, 10 and 16 are shown for comparison.

Table 2 shows that the shaped bodies of the invention, ranging from 21 to 70% in hematite content, have fully satisfactory strength for use and are further exceedingly lower in thermal conductivity over a wide temperature range than the hematite-free shaped body, specimen No. 9. When compared with the hematite-free shaped body, specimen No. 9, specimen No. 10 having a low hematite content is lower in thermal conductivity at an average temperature of 150° C. or higher, but the reduction is insufficient, and there is little or no reduction in thermal conductivity at an average temperature of 70° C. Specimen No. 16 which conversely has a high hematite content is insufficient in the reduction of thermal conductivity, has exceedingly low bending strength and is not actually usable.

EXAMPLE 3

Quick lime (32.0 parts, CaO 95%) was hydrated in 384 parts of hot water at 80° C. and then dispersed in water by a homomixer to obtain a lime milk, which was 21.3 ml in sedimentation volume. To the lime milk were added 34.7 parts of siliceous stone powder (SiO$_2$ 94%) and 33.3 parts of iron oxide powder (30% based on the shaped body) which were the same as those used in Example 2. With addition of water to the mixture, a starting slurry was obtained which contained water in 20 times the amount by weight of the solids. The slurry was subjected to a hydrothermal synthesis reaction in an autoclave at a saturated water vapor pressure of 12 kg/cm$^2$ and a temperature of 191° C. for 5 hours while being stirred by a stirrer which was rotated at 40 r.p.m. In this way, a slurry of calcium silicate crystals was prepared.

A portion of the crystal slurry was dried at 100° C. for 24 hours and then analyzed by X-ray diffractometer. The analaysis revealed the peaks of xonotlite and hematite crystals.

When the crystal slurry was observed under an optical microscope as well as under a scanning electron microscope, the slurry was found to contain globular shell-like secondary particles having an outside diameter of 5 to 150 μm and composed of three-dimensionally interlocked xonotlite crystals. Hematite crystals were found to have been physically united with the secondary particles of xonotlite crystals as enclosed therein.

Subsequently, 7 parts of glass fibers and 3 parts of portland cement were added to 90 parts (solids) of the slurry, and the mixture was pressed for dewatering and shaping, and then dried at 100° C. to obtain two kinds of shaped bodies of the invention which were different in bulk density and having the same shape as those in Example 1 (specimens Nos. 17 and 18).

The shaped bodies thus prepared were checked for structure by an optical microscope and scanning electron microscope. Both the bodies were found to have been composed of a multiplicity of interconnected secondary particles of xonotlite crystals. In the bodies, hematite crystals were physically united with the secondary particles as enclosed therein.

For comparison, shaped bodies (specimen Nos. 19 and 20) of similar shape were prepared in the same manner as above except that no iron oxide powder was used.

Table 3 shows the properties of the shaped bodies obtained.

TABLE 3

| Specimen No. | 17 | 18 | 19 | 20 |
|---|---|---|---|---|
| Hematite content (in shaped body, %) | 30 | 30 | 0 | 0 |
| Properties of shaped body | | | | |
| Bulk density (g/cm$^3$) | 0.105 | 0.203 | 0.104 | 0.203 |
| Bending strength (kg/cm$^2$) | 5.1 | 15.3 | 6.1 | 18.2 |
| Thermal conductivity (Kcal/m · hr. °C.) Average temp. | | | | |
| 70° C. | 0.038 | 0.043 | 0.042 | 0.048 |
| 150° C. | 0.044 | 0.048 | 0.050 | 0.053 |
| 250° C. | 0.054 | 0.052 | 0.065 | 0.063 |
| 350° C. | 0.065 | 0.060 | 0.084 | 0.077 |

COMPARATIVE EXAMPLE 1

Quick lime (CaO 95%) was hydrated in hot water at 80° C. to obtain a lime milk, to which a siliceous stone powder (SiO$_2$ 94%) was added in the CaO/SiO$_2$ mole ratio of 1.00. Further added to the mixture were the same iron oxide powder (hematite) as used in Example 2 in a specified amount based on the shaped body to be formed, and chrysotile asbestos in an amount of 20% based on the shaped body. With addition of water, a starting slurry was prepared which contained water in 7 times the amount by weight of the solids. The slurry was placed into a tubular mold, 114 mm in inside diameter, 50 in wall thickness and 610 mm in length, and then subjected to a hydrothermal synthesis reaction at a saturated water vapor pressure of 15 kg/cm² and at a temperature of 200° C. for 6 hours.

After the reaction, the mold was withdrawn, and the product was removed from the mold and dried. The shaped body obtained was found to have been composed of xonotlite crystals by X-ray diffraction method. When fractured surfaces of shaped bodies similarly prepared were observed under an optical microscope and scanning electron microscope to check the bodies for the structure, no secondary particles of xonotlite crystals were found.

Table 4 shows the properties, etc.

TABLE 4

| Specimen No. | 21 | 22 | 23 | 24 |
|---|---|---|---|---|
| Hematite content (in shaped body, %) | 0 | 10 | 20 | 25 |
| Properties of shaped body | | | | |
| Bulk density (g/cm³) | 0.153 | 0.156 | 0.165 | *1 |
| Bending strength (kg/cm²) | 4.2 | 2.2 | 1.3 | |

*1 Even if it was attempted to attain a bulk density of 0.16 or 0.20, the reaction failed to give a shaped body of desired dimensions owing to the sedimentation of solids in the mold.

Table 4 shows that with the shaped bodies which were obtained by shaping a hematite-containing starting slurry and subjecting the shaped body to hydrothermal reaction and in which no secondary particles of xonotlite crystals were present, the bending strength decreases markedly with increasing hematite content, with the result that the body fails to have strength for use when 20% of hematite is present. It is seen that above 25%, lightweight bodies about 0.16 or 0.20 g/cm³ in bulk density are no longer obtainable.

COMPARATIVE EXAMPLE 2

A slurry of calcium silicate crystals was prepared in the same manner as in Example 1 except that no titanium oxide powder was used.

A portion of the crystal slurry was dried at 100° C. for 24 hours and then analyzed by X-ray diffractometer. The analysis revealed the peak of xonotlite crystals. When the slurry was dried on slide glass and observed under an optical microscope, globular secondary particles were found which were 5 to 150 μm in outside diameter.

Subsequently, to 90 parts (solids) of the slurry were added 7 parts of glass fibers, 3 parts of portland cement and the same titanium oxide powder as used in Example 1 in an amount of 25% by weight or 40% by weight based on the shaped body to be obtained. The mixtures thus prepared were pressed for dewatering and shaping, and then dried at 100° C. to obtain comparative shaped bodies of the same shape as those obtained in Example 1.

Table 5 shows the properties of the shaped bodies.

TABLE 5

| Specimen No. | 25 | 26 | 27 |
|---|---|---|---|
| Rutile content (in shaped body, %) | 0 | 25 | 40 |
| Properties of shaped body | | | |
| Bulk density (g/cm³) | 0.150 | 0.151 | Failed to form a shaped body having a bulk density of about 0.15. |
| Bending strength (kg/cm²) | 9.8 | 1.3 | |

Table 5 shows that when more than 20% by weight of titanium oxide powder was added to the slurry after the hydrothermal synthesis reaction, markedly impaired bending strength resulted.

COMPARATIVE EXAMPLE 3

A starting slurry prepared in the same manner as in Comparative Example 2 except that the slurry contained water in 30 times the amount by weight of the solids was subjected to a hydrothermal synthesis reaction in an autoclave at a saturated water vapor pressure of 15 kg/cm² and a temperature of 200° C. for 2 hours while being stirred by a stirrer which was driven at 40 r.p.m. to prepare an aqueous slurry consisting primarily of C—S—H (I).

Comparative shaped bodies having the same shape as those in Example 1 were prepared by adding to 93 parts (solids) of the slurry obtained above 7 parts of alkali-resistant glass fibers singly, or in combination with 25% by weight or 40% by weight, based on the shaped body, of the same titanium oxide powder as used in Example 1, and pressing the mixture for dewatering and shaping. The shaped bodies were cured with steam at a saturated water vapor pressure of 15 kg/cm² for 3 hours and thereafter dried at 100° C.

The shaped bodies were analyzed by X-ray diffractometer. The analysis revealed the peak of xonotlite crystals in all the bodies and further the peak of rutile crystals in the bodies containing titanium oxide particles.

Table 6 shows the properties of the bodies.

TABLE 6

| Specimen No. | 28 | 29 | 30 |
|---|---|---|---|
| Rutile content (in shaped body, %) | 0 | 25 | 40 |
| Properties of shaped body | | | |
| Bulk density (g/cm³) | 0.151 | 0.151 | Failed to form a shaped body having a bulk density of about 0.15. |
| Bending strength (kg/cm²) | 8.0 | 1.1 | |

Table 6 shows that when the slurry of C—S—H (I) contains titanium oxide powder added thereto and is shaped, the shaped body exhibits seriously impaired bending strength even if cured with steam after shaping.

COMPARATIVE EXAMPLE 4

An aqueous slurry comprising C—S—H (I) and rutile crystals was prepared in the same manner as in Comparative Example 3 with the exception of adding to the starting slurry the same titanium oxide powder as used in Example 1, in an amount of 15% or 25% based on the shaped body to be obtained.

Subsequently, 7 parts of alkali-resistant glass fibers the same as those used in Comparative Example 3 were added to 93 parts (solids) of the slurry obtained above, and the mixture was pressed for dewatering and shaping, giving a comparative shaped body of the same shape as those in Example 1. The shaped body was cured with steam at a saturated water vapor pressure of 15 kg/cm² for 3 hours and thereafter dried at 100° C.

When the shaped body obtained was checked by X-ray diffraction method, the peaks of xonotlite crystals and rutile crystals were observed.

The shaped body markedly deformed or shrank on drying, failing to retain the desired shape.

The above result indicates that when not smaller than about 15% of titanium oxide powder is present, shaped bodies are difficult to produce by the process comprising pre-reacting a starting slurry containing titanium oxide particles to obtain a slurry of C—S—H (I), shaping the slurry and curing the shaped body with steam.

EXAMPLE 4

Quick lime (32 parts, CaO 95%) was hydrated in 384 parts of hot water at 80° C. and then dispersed in water by a homomixer to obtain a lime milk, which was 15 to 16 ml in sedimentation volume. To the lime milk were added 34.7 parts of siliceous stone powder ($SiO_2$ 94%) having a mean particle size of 6.5 μm and 33.3 parts (30% based on the shaped body to be obtained) of the inactive substance listed in Table 7. With addition of water to the mixture, a starting slurry was obtained which contained water in 15 times the amount by weight of the solids. The slurry was subjected to a hydrothermal synthesis reaction in an autoclave at a saturated water vapor pressure of 12 kg/cm$^2$ and a temperature of 191° C. for 5 hours while being stirred by a stirrer which was driven at 40 r.p.m. In this way, slurries of calcium silicate crystals were prepared.

Portions of the crystal slurries were dried at 100° C. for 24 hours and then analyzed by X-ray diffractometer. The analysis revealed the peaks of xonotlite crystals and the above inactive substance.

When the crystal slurries were observed under an optical microscope and scanning electron microscope, all the slurries were found to contain globular shell-like secondary particles having an outside diameter of 5 to 150 μm and composed of three-dimensionally interlocked xonotite crystals. With the slurry containing the inactive substance, the inactive substance was found to have been physically united with secondary particles of xonotlite crystals as enclosed therein.

To check the shaped bodies obtained for the structure, fractured surfaces of these bodies were observed under an optical microscope and scanning electron microscope. Consequently, all the shaped bodies were found to have been composed of a multiplicity of interconnected secondary particles of xonotlite crystals. With those containing theinactive substance, the substance was found to have been physically united with the secondary particles as enclosed therein.

Table 7 shows the properties of the shaped bodies obtained.

TABLE 7

| Specimen No. | 31 | 32 | 33 | 34 | 35 |
|---|---|---|---|---|---|
| Inactive substance | | | | | |
| Name | Silicon carbide | Silicon carbide | Titanium oxide (rutile) | Zirconium oxide | None |
| Mean particle size (μm) | 3.5 | 42 | 0.15 | 4.5 | |
| Content (in shaped body, %) | 30 | 30 | 30 | 30 | 0 |
| Sedimentation volume of lime milk (ml) | 15.0 | 15.4 | 15.3 | 15.1 | 16.0 |
| Properties of shaped body | | | | | |
| Bulk density (g/cm$^3$) | 0.149 | 0.150 | 0.148 | 0.151 | 0.149 |
| Bending strength (kg/cm$^2$) | 8.0 | 7.5 | 7.9 | 8.1 | 9.4 |
| Thermal conductivity (Kcal/m · hr. °C.) Average temp. | | | | | |
| 70° C. | 0.038 | 0.039 | 0.039 | 0.038 | 0.043 |
| 150° C. | 0.043 | 0.045 | 0.047 | 0.045 | 0.051 |
| 250° C. | 0.051 | 0.054 | 0.057 | 0.055 | 0.063 |
| 350° C. | 0.058 | 0.063 | 0.068 | 0.067 | 0.080 |

Further shaped bodies comparable to the above bodies in properties were obtained using silicon nitride, calcium silicide, tin oxide and manganese oxide in the same manner as above.

EXAMPLE 5

Quick lime (38.4 parts, CaO 95%) was hydrated in 474 parts of hot water at 80° C. and then dispersed in water by a homomixer to obtain a lime milk, which was 18 ml in sedimentation volume. To the lime milk were added 41.6 parts of siliceous stone powder ($SiO_2$ 94%) having a mean particle size of 7.4 μm and 20.0 parts (15.0% based on the shaped body to be obtained) of iron oxide powder (hematite), 0.51 μm in mean particle size. With addition of water to the mixture, a starting slurry was obtained which contained water in 20 times the amount by weight of the solids. The slurry was subjected to a hydrothermal synthesis reaction in an autoclave at a saturated water vapor pressure of 12 kg/cm$^2$ and a temperature of 191° C. for 5 hours while being stirred by a stirrer which was driven at 40 r.p.m. In this way, a slurry of calcium silicate crystals was prepared.

A portion of the crystal slurry was dried at 100° C. for 24 hours and then analyzed by X-ray diffractometer. The analysis revealed the peaks of xonotlite crystals and hematite crystals.

When the crystal slurry was observed under an optical microscope and scanning electron microscope, the slurry was found to contain globular shell-like secondary particles having an outside diameter of 5 to 150 μm and composed of three-dimensionally interlocked xonotlite crystals. Hematite crystals were found to have been physically united with secondary particles of xonotlite crystals as enclosed therein.

Subsequently, to 75 parts (solids) of the crystal slurry obtained above were added 10 parts of white carbon (trademark "Tokusil GU," product of Tokuyama Soda Co., Ltd., 0.02 to 0.04 μm in particle size) and the additives of 7 parts of glass fibers, 5 parts of pulp and 3 parts of portland cement. The mixture was pressed for dewatering and shaping, and then dried at 100° C., giving a shaped body (specimen No. 36) of the invention having the same shape as those in Example 1. Further a shaped body (specimen No. 37) of the invention having like shape was prepared in the same manner as above with the exception of using Opsil-II, 10 to 60 μm in outside diameter, in place of white carbon.

Table 8 below shows the properties of the shaped used in such a combined amount as to give an additive content of 15% to the shaped body as in Example 5.

Table 8 shows the properties of the shaped bodies obtained in Example 5 and Comparative Example 5.

TABLE 8

| Specimen No. | Example 5 | | Comparative Example 5 | | | | |
|---|---|---|---|---|---|---|---|
| | 36 | 37 | 38 | 39 | 40 | 41 | 42 |
| Hematite content (in shaped body, %) | 15 | 15 | 0 | 15 | 0 | 15 | 15** |
| Content of amorphous siliceous substance (in shaped body, %) | 10 | 10 | 0 | 0 | 10 | 0* | 10 |
| Properties of shaped body | | | | | | | |
| Bulk density (g/cm³) | 0.112 | 0.111 | 0.113 | 0.110 | 0.113 | 0.120 | 0.114 |
| Bending strength (kg/cm²) | 4.5 | 6.0 | 6.3 | 6.1 | 6.2 | 3.2 | 1.2 |
| Thermal conductivity (Kcal/m · hr. °C.) Average temp. | | | | | | | |
| 70° C. | 0.038 | 0.038 | 0.042 | 0.041 | 0.039 | 0.042 | 0.039 |
| 150° C. | 0.044 | 0.044 | 0.049 | 0.046 | 0.047 | 0.046 | 0.045 |
| 250° C. | 0.057 | 0.057 | 0.064 | 0.058 | 0.064 | 0.058 | 0.057 |
| 350° C. | 0.071 | 0.071 | 0.085 | 0.072 | 0.086 | 0.072 | 0.071 |

Note:
*Containing 10% of crystalline silica.
**Added after hydrothermal synthesis reaction.

bodies.

Opsil-II was prepared in the same manner as in Example 6 disclosed in U.S. Pat. No. 4,230,765, i.e. by the follwing procedure. A slurry of xonotlite crystals obtained by hydrothermal synthesis reaction was dewatered to the water to solids (xonotlite crystals) ratio of 5/1 by weight, then placed into a container having a wet atmosphere and reacted for about 30 minutes with carbon dioxide gas forced into an internal pressure of 3 kg/cm². Subsequently, the reaction mixture was treated with 6N hydrochloric acid solution for 1 minute and thereafter thoroughly washed with water to completely dissolve out calcium chloride, giving a slurry of bulky amorphous silica gel secondary particles having an outside diameter of 10 to 60 μm. The slurry was dried and used as Opsil-II.

COMPARATIVE EXAMPLE 5

By the same procedure as used for producing the shaped body, specimen No. 36, of Example 5, a comparative shaped body (specimen No. 38) of similar shape was prepared without using any iron oxide powder or white carbon.

A comparative shaped body (specimen No. 39) of similar shape was prepared in the same manner as specimen No. 36 with the exception of using no white carbon and using 17.15 parts of iron oxide powder to give an iron oxide content of 15% to the shaped body.

A comparative shaped body (specimen No. 40) of similar shape was prepared in the same manner as specimen No. 37 except that no iron oxide powder was used.

A comparative shaped body (specimen No. 41) of similar shape was prepared in the same manner as specimen No. 36 except that white carbon, which is an amorphous silica, was replaced by a siliceous stone powder (4 μm in mean particle size) which is a crystalline silica.

A comparative shaped body (specimen No. 42) of similar shape was prepared in the same manner as specimen No. 36 with the exception of conducting the hydrothermal reaction without adding iron oxide powder to the starting slurry and adding to the resulting slurry iron oxide powder and white carbon each in the same amount as used for specimen No. 36.

For each specimen of Comparative Example 5, the additives (glass fiber:pulp:portland cement=7:5:3) were used in such a combined amount as to give an additive content of 15% to the shaped body as in Example 5.

Table 8 shows that by adding an inactive substance to the starting slurry to be subjected to hydrothermal synthesis reaction and an amorphous siliceous substance to the slurry resulting from the reaction, shaped bodies of calcium silicate can be obtained which retain fully satisfactory strength for use and which further exhibit a remarkably reduced thermal conductivity over a wide temperature range of from low to high temperatures even when the content of inactive substance is 15%.

It is also seen that the use of Opsil-II results in higher strength than when white carbon is used.

EXAMPLE 6

Quick lime (38.4 parts, CaO 95%) was hydrated in 474 parts of hot water at 80° C. and then dispersed in water by a homomixer to obtain a lime milk, which was 17 to 20 ml in sedimentation volume. To the milk were added 416 parts of siliceous stone powder (SiO₂ 95%) having a mean particle size of 6.5 μm and 20.0 parts (15% based on the shaped body to be obtained) of the inactive substance listed in Table 9. The mixture was subjected to a hydrothermal synthesis reaction in the same manner as in Example 5. In this way, slurries of calcium silicate crystals were prepared.

Portions of the crystal slurries were dried at 100° C. for 24 hours and then analyzed by X-ray diffractometer. The analysis revealed the peaks of xonotlite crystals and the above inactive substance.

When the crystal slurries were observed under an optical microscope and scanning electron microscope, all the slurries were found to contain globular shell-like secondary particles having an outside diameter of 5 to 150 μm and composed of three-dimensionally interlocked xonotlite crystals, with the inactive substance physically united with the secondary particles of xonotlite crystals as enclosed therein.

Subsequently, to 75 parts (solids) of each crystal slurry thus obtained were added 10 parts of the amorphous siliceous substance listed in Table 9 below, and the additives of 7 parts of glass fibers, 5 parts of pulp and 3 parts of portland cement. The mixture was dewatered and shaped by a press and then dried at 100° C. Thus, shaped bodies of this invention were prepared in the same shape as those in Example 1.

Table 9 shows the properties of the shaped bodies.

TABLE 9

| Specimen No. | 43 | 44 | 45 | 46 | 47 | 48 | 49 | 50 | 51 |
|---|---|---|---|---|---|---|---|---|---|
| Inactive substance | Graphite | Silicon carbide | Titanium oxide (rutile) | Silicon nitride | Manganese oxide | Titanium carbide | Tin oxide | Boron nitride | Iron oxide (hematite) |
| Mean particle size ($\mu$m) | 7.5 | 3.5 | 0.26 | 5.0 | 4.0 | 5.0 | 6.2 | 6.0 | 7.4 |
| Content (in shaped body, %) | 15 | 15 | 15 | 15 | 15 | 15 | 15 | 15 | 15 |
| Sedimentation volume of lime milk (ml) | 17 | 19 | 18 | 20 | 17 | 17 | 20 | 19 | 19 |
| Amorphous siliceous substance | Opsil-II | Opsil-II | Opsil-II | Ferro-silicon dust | Fly ash | Ferro-silicon dust | Opsil-II | Diatomaceous earth | Diatomaceous earth |
| Particle size ($\mu$m) | 10~60 (Outside diameter) | 10~60 (Outside diameter) | 10~60 (Outside diameter) | 0.24 (Mean) | 4~44 | 0.24 (Mean) | 10~60 (Outside diameter) | 1~50 | 1~50 |
| Content (in shaped body, %) | 10 | 10 | 10 | 10 | 10 | 10 | 10 | 10 | 10 |
| Properties of shaped body | | | | | | | | | |
| Bulk density (g/cm$^3$) | 0.111 | 0.110 | 0.112 | 0.112 | 0.111 | 0.114 | 0.109 | 0.109 | 0.114 |
| Bending strength (kg/cm$^2$) | 6.2 | 5.9 | 6.1 | 4.6 | 4.8 | 4.6 | 6.1 | 4.7 | 4.5 |
| Thermal conductivity (Kcal/m · hr. °C.) Average temp. | | | | | | | | | |
| 70° C. | 0.038 | 0.038 | 0.039 | 0.038 | 0.038 | 0.039 | 0.038 | 0.039 | 0.038 |
| 150° C. | 0.044 | 0.044 | 0.045 | 0.045 | 0.045 | 0.045 | 0.044 | 0.044 | 0.044 |
| 250° C. | 0.054 | 0.054 | 0.059 | 0.055 | 0.056 | 0.058 | 0.055 | 0.055 | 0.054 |
| 350° C. | 0.072 | 0.065 | 0.076 | 0.067 | 0.072 | 0.076 | 0.073 | 0.070 | 0.065 |

Opsil-II in Table 9 is the same as the one used in Example 5.

Table 9 shows that various different combinations of inactive substance and amorphous siliceous substance also afford shaped bodies retaining fully satisfactory strength for use and a remarkably reduced thermal conductivity over a wide temperature range.

EXAMPLE 7

To 65 parts (solids) of a slurry of calcium silicate crystals prepared in the same manner as in Example 5 were added 20 parts of white carbon (trademark "Nipsil VN3," product of Nippon Silica Industrial Co., Ltd., mean particle size of 0.016 $\mu$m), and the additives of 7 parts of glass fibers, 5 parts of pulp and 3 parts of portland cement. The mixture was dewatered and shaped by a press, and then dried at 100° C. Thus shaped bodies of the invention were prepared in the same shape as those of Example 1. The hematite content of the resulting shaped bodies was 13%.

Table 10 shows the properties of the shaped bodies.

TABLE 10

| Specimen No. | 52 | 53 |
|---|---|---|
| Hematite content (in shaped body, %) | 13 | 13 |
| White carbon content (in shaped body, %) | 20 | 20 |
| Properties of shaped body | | |
| Bulk density (g/cm$^3$) | 0.110 | 0.155 |
| Bending strength (kg/cm$^2$) | 4.1 | 8.8 |
| Thermal conductivity (Kcal/m · hr. °C.) Average temp. | | |
| 70° C. | 0.037 | 0.039 |
| 150° C. | 0.043 | 0.045 |
| 250° C. | 0.057 | 0.055 |
| 350° C. | 0.072 | 0.067 |

EXAMPLE 8

Quick lime (33.0 parts, CaO 95%) was hydrated in 396 parts of hot water at 80° C. and then dispersed in water by a homomixer to obtain a lime milk, which was 23.6 ml in sedimentation volume. To the milk were added 35.7 parts of the same siliceous stone powder as used in Example 5 and 31.3 parts (25.0% based on the shaped body to be obtained) of the same iron oxide powder (hematite) as used in Example 5. With addition of water to the mixture, a starting slurry was obtained which contained water in 20 times the amount by weight of the solids. The slurry was subjected to a hydrothermal synthesis reaction in an autoclave at a saturated water vapor pressure of 12 kg/cm$^2$ and a temperature of 191° C. for 5 hours while being stirred by a stirrer which was driven at 40 r.p.m. In this way, a slurry of calcium silicate crystals was prepared.

A portion of the crystal slurry was dried at 100° C. for 24 hours and then analyzed by X-ray diffractometer. The analysis revealed the peaks of xonotlite crystals and hematite crystals.

When the crystal slurry was observed under an optical microscope and scanning electron microscope, the slurry was found to contain globular shell-like secondary particles having an outside diameter of 5 to 150 $\mu$m and composed of three-dimensionally interlocked xonotlite crystals, with hematite crystals physically united with the xonotlite crystal secondary particles as enclosed therein.

Subsequently, to 80 parts (solids) of the slurry thus obtained were added 10 parts of Opsil-II, the same as the one used in Example 5, and the additives of 7 parts of glass fibers and 3 parts of cement. The mixture was shaped by a press and then dried at 100° C. In this way, two kinds of shaped bodies (specimen No. 54 and 55) were prepared which were different in bulk density and in the same shape as those of Example 1. Table 11 shows the properties.

COMPARATIVE EXAMPLE 6

By the same procedure as Example 8, comparative shaped bodies (specimen Nos. 56 and 57) were prepared in a similar shape except that the lime milk was 18 ml in sedimentation volume and that no iron oxide powder or Opsil-II was used.

Comparative shaped bodies (specimen Nos. 58 and 59) of similar shape were prepared in the same manner as in Example 8 except that the lime milk was 18 ml in sedimentation volume and that no iron oxide powder was used.

In Comparative Example 6, the additives (glass fibers:cement=7:3) were used in such a combined amount as to give an additive content of 10% to the shaped bodies as in Example 8.

Table 11 shows the properties of the shaped bodies obtained in Example 8 and Comparative Example 6.

TABLE 11

| Specimen No. | Example 8 | | Comparative Example 6 | | | |
|---|---|---|---|---|---|---|
| | 54 | 55 | 56 | 57 | 58 | 59 |
| Hematite content (in shaped body, %) | 25 | 25 | 0 | 0 | 0 | 0 |
| Opsil-II content (in shaped body, %) | 10 | 10 | 0 | 0 | 10 | 10 |
| Properties of shaped body | | | | | | |
| Bulk density (g/cm$^3$) | 0.148 | 0.201 | 0.149 | 0.200 | 0.150 | 0.201 |
| Bending strength (kg/cm$^2$) | 8.4 | 15.0 | 11.2 | 17.8 | 10.3 | 17.7 |
| Thermal conductivity (Kcal/m · hr. °C.) Average temp. | | | | | | |
| 70° C. | 0.037 | 0.040 | 0.043 | 0.047 | 0.041 | 0.045 |
| 150° C. | 0.042 | 0.045 | 0.051 | 0.052 | 0.051 | 0.051 |
| 250° C. | 0.050 | 0.052 | 0.063 | 0.062 | 0.065 | 0.064 |
| 350° C. | 0.060 | 0.059 | 0.081 | 0.076 | 0.084 | 0.079 |

We claim:

1. A calcium silicate shaped body comprising a multiplicity of interconnected secondary particles of calcium silicate crystals, voids interspersed between the secondary particles, and at least one inorganic inactive substance selected from among carbonaceous substance, carbide, nitride, silicide and metallic oxide and physically united with the secondary particles, the shaped body containing the inactive substance in an amount of 21 to 70% by weight.

2. A shaped body as defined in claim 1 wherein the inactive substance is physically united with the secondary particles of calcium silicate crystals as enclosed therein.

3. A shaped body as defined in claim 1 wherein the secondary particles of calcium silicate crystals are originally in the form of substantially globular shells having an outside diameter of about 5 to about 150 μm and formed of three-dimensionally interlocked calcium silicate crystals.

4. A shaped body as defined in claim 1 which contains the inactive substance in an amount of 25 to 55% by weight.

5. A shaped body as defined in claim 1 wherein the carbonaceous substance is at least one of active carbon, charcoal, coal, carbon black and graphite, the carbide being at least one of silicon carbide, boron carbide and titanium carbide, the nitride being at least one of silicon nitride, boron nitride and titanium nitride, the silicide being calcium silicide, the metallic oxide being at least one of iron oxide, titanium oxide, tin oxide, manganese oxide, zirconium oxide, ilmenite, zircon and chromite.

6. A shaped body as defined in claim 1 wherein the calcium silicate crystals are tobermorite crystals and/or xonotlite crystals.

7. A calcium silicate shaped body comprising a multiplicity of interconnected secondary particles of calcium silicate crystals, voids interspersed between the secondary particles, at least one inorganic inactive substance selected from among carbonaceous substance, carbide, nitride, silicide and metallic oxide and physically united with the secondary particles, and an amorphous siliceous substance.

8. A shaped body as defined in claim 7 wherein the inactive substance is physically united with the secondary particles of calcium silicate crystals as enclosed therein.

9. A shaped body as defined in claim 7 wherein the secondary particles of calcium silicate crystals are originally in the form of substantially globular shells having an outside diameter of about 5 to about 150 μm and formed of three-dimensionally interlocked calcium silicate crystals.

10. A shaped body as defined in claim 7 wherein the carbonaceous substance is at least one of active carbon, charcoal, coal, carbon black and graphite, the carbide being at least one of silicon carbide, boron carbide and titanium carbide, the nitride being at least one of silicon nitride, boron nitride and titanium nitride, the silicide being calcium silicide, the metallic oxide being at least one of iron oxide, titanium oxide, tin oxide, manganese oxide, zirconium oxide, ilmenite, zircon and chromite.

11. A shaped body as defined in claim 7 which contains the inactive substance in an amount of 2 to 60% by weight.

12. A shaped body as defined in claim 11 which contains the inactive substance in an amount of 5 to 50% by weight.

13. A shaped body as defined in claim 7 wherein the amorphous siliceous substance is at least one of white carbon, ferrosilicon dust, silicon dust, diatomaceous earth, fly ash and silica gel.

14. A shaped body as defined in claim 7 wherein the amorphous siliceous substance is Opsil-II.

15. A shaped body as defined in claim 7 which contains the amorphous siliceous substance in an amount of 2 to 60% by weight.

16. A shaped body as defined in claim 15 which contains the amorphous siliceous substance in an amount of 5 to 50% by weight.

17. A shaped body as defined in claim 7 which contains the inactive substance and the amorphous siliceous substance in a combined amount of 4 to 70% by weight.

18. A shaped body as defined in claim 17 which contains the inactive substance and the amorphous siliceous substance in a combined amount of 10 to 50% by weight.

19. A shaped body as defined in claim 7 wherein the calcium silicate crystals are tobermorite crystals and/or xonotlite crystals.

* * * * *